United States Patent
Corless (10) Patent No.: US 12,484,591 B2
(45) Date of Patent: Dec. 2, 2025

(54) COOKING FIXTURE WITH MODIFIED COOKING SURFACE FOR SELECTIVE BROWNING EFFECT

(71) Applicant: CPM WOLVERINE PROCTOR LLC, Lexington, NC (US)

(72) Inventor: Justin Corless, Flower Mound, TX (US)

(73) Assignee: CPM WOLVERINE PROCTOR LLC

( * ) Notice: Subject to any disclaimer, the term of this patent is extended or adjusted under 35 U.S.C. 154(b) by 737 days.

(21) Appl. No.: 17/686,779

(22) Filed: Mar. 4, 2022

(65) Prior Publication Data

US 2022/0287316 A1  Sep. 15, 2022

Related U.S. Application Data (60) Provisional application No. 63/158,793, filed on Mar. 9, 2021.

(51) Int. Cl.
*A21D 8/06* (2006.01)
*A21B 7/00* (2006.01)

(52) U.S. Cl.
CPC . *A21D 8/06* (2013.01); *A21B 7/00* (2013.01)

(58) Field of Classification Search
CPC ................ A21B 7/00; A21B 1/48; A21D 8/06
USPC ...................................................... 426/496
See application file for complete search history.

(56) References Cited

U.S. PATENT DOCUMENTS

| | | | |
|---|---|---|---|
| 5,131,320 A * | 7/1992 | Jensen | F24C 15/10 |
| | | | 99/422 |
| 5,680,956 A | 10/1997 | Woodward et al. | |
| 5,800,853 A | 9/1998 | Wang | |
| 8,584,580 B2 | 11/2013 | Barrett | |
| 8,803,050 B2 | 8/2014 | Lafferty et al. | |
| 2008/0181996 A1 | 7/2008 | Yother | |
| 2020/0236950 A1 | 7/2020 | Wirth et al. | |

OTHER PUBLICATIONS

Amazon.com, "Prestige Aerolift Baking Trays for Oven Non Stick Set of 3—Dishwasher Safe Oven Trays Set with Extra Large Handles, Durable Carbon Steel Roasting Tins with 5 Year Guarantee, Black", Amazon, URL: https://www.amazon.com/Prestige-Aerolift-Baking-Trays-Stick/dp/B0BBGFTSZY?th=1, Last accessed Jan. 10, 2025, 2 pages.
Nordicware.com, "Oven Crisp Baking Tray", Nordic Ware, URL: https://www.nordicware.com/products/oven-crisp-baking-tray/, Last accessed Jan. 10, 2025, 2 pages.
USAPan.com, "3-Piece Bakeware Set", USA Pan, UPL: https://www.usapan.com/three-piece-bakeware-set-1310st, Last accessed Jan. 10, 2025, 2 pages.

* cited by examiner

*Primary Examiner* — Subbalakshmi Prakash
(74) *Attorney, Agent, or Firm* — FAEGRE DRINKER BIDDLE & REATH LLP (57) ABSTRACT

A cooking fixture including a base defining a cooking surface, the cooking surface having a raised area and a depressed area, the raised area being planar, and the depressed area being defined by a plurality of pockets arranged in a random pattern. Each pocket has a depth relative to the raised area.

20 Claims, 9 Drawing Sheets

COOKING FIXTURE WITH MODIFIED COOKING SURFACE FOR SELECTIVE BROWNING EFFECT

CROSS REFERENCE TO RELATED APPLICATION

This application claims priority to U.S. Provisional Application No. 63/158,793, filed Mar. 9, 2021, which is herein incorporated by reference in its entirety.

BACKGROUND

Conveyorized and batch oven systems for baked products may use a cooking fixture such as a mold, tray, griddle, or the like to support a mass of dough or batter in an oven. One example of such a system is offered by TSA Griddle Systems, Inc. in the form of Model 1000GC and 1500GC Griddle Cake Machines. Each of TSA's Model 1000GC and 1500GC utilizes molds for baking. Oil and/or release agents can be applied to the molds prior to the molds receiving batter via batter depositors. Once the molds are filled with batter, the batter can then be baked in the oven, or cooker part of the systems. The Griddle Cake Machines are automated, the machines being controlled by a programmable logic controller operated via an associated user interface.

SUMMARY

While prior conveyorized and batch oven systems such as TSA's Model 1000GC and 1500GC, have been used to good effect, inventive embodiments of this description address conveyorized or batch oven systems with cooking fixtures (e.g., molds, trays, griddles and the like) having cooking surfaces that are configured to produce a selective browning effect in cooked-batter products. In various examples, the cooking surfaces are modified to reproduce a cooking pattern exhibited by batter products cooked on cooking surfaces treated with oil or release agent, where such effect is still exhibited either in the absence of, or with reduced amounts of oil or release agent present on the cooking surfaces.

According to a first example ("Example 1"), a cooking fixture comprises a base defining a cooking surface, the cooking surface having a raised area and a depressed area. The raised area is planar, and the depressed area being defined by a plurality of pockets arranged in a random pattern, each pocket having a depth relative to the raised area.

According to another example ("Example 2"), further to the cooking fixture of Example 1, each pocket of the plurality of pockets has a circular shape.

According to another example ("Example 3"), further to the cooking fixture of Example 2, a diameter of the circular shape ranges from a value of $\frac{1}{8}^{th}$ of an inch to $\frac{2}{8}^{th}$ of an inch.

According to another example ("Example 4"), further to the cooking fixture of Example 1, the random pattern includes interconnected pockets.

According to another example ("Example 5"), further to the cooking fixture of Example 1, the random pattern includes separate, unconnected pockets.

According to another example ("Example 6"), further to the cooking fixture of Example 1, a surface area defined by the depressed area is greater than a surface area defined by the raised area.

According to another example, ("Example 7"), further to the cooking fixture of Example 1, a surface area defined by the depressed area is equal to a surface area defined by the raised area.

According to another example, ("Example 8"), further to the cooking fixture of Example 1, a surface area defined by the depressed area is less than a surface area defined by the raised area.

According to another example, ("Example 9"), further to the cooking fixture of Example 1, the depressed area is planar.

According to another example, ("Example 10"), further to the cooking fixture of Example 1, the depressed area is non-planar.

According to another example, ("Example 11"), further to the cooking fixture of Example 1, at least one the pockets of the plurality of pockets has a volume that is different than another one of the pockets of the plurality of pockets.

According to another example, ("Example 12"), further to the cooking fixture of Example 1, each of the pockets of the plurality of pockets have the same volume.

According to another example, ("Example 13"), further to the cooking fixture of Example 1, each of the pockets of the plurality of pockets has an irregular outline.

According to another example, ("Example 14"), further to the cooking fixture of Example 1, the cooking surface is formed using at least one of an additive and a subtractive manufacturing process.

According to another example ("Example 15"), a method of cooking a batter product to produce a cooked product includes depositing a batter product in a cooking fixture, the cooking fixture being substantially free of an additional release agent when the batter is deposited in the cooking fixture, the cooking fixture including a cooking surface having a raised area and a depressed area, the raised area being planar and the depressed area being defined by a plurality of pockets arranged in a random pattern. The method further includes baking the batter product to produce a cooked product from the batter product, the cooked product having a cooked surface corresponding to the cooking surface of the cooking fixture, and the cooked surface having a random mottled pattern of relatively darker and lighter areas.

According to another example, ("Example 16"), further to the method of Example 15, each pocket of the plurality of pockets has a circular shape.

According to another example, ("Example 17"), further to the method of Example 16, a diameter of the circular shape ranges from a value of $\frac{1}{8}^{th}$ of an inch to $\frac{2}{8}^{th}$ of an inch.

According to another example, ("Example 18"), further to the method of Example 15, the random mottled pattern includes interconnected pockets.

According to another example, ("Example 19"), further to the method of Example 15, the random mottled pattern includes separate, unconnected pockets.

According to another example, ("Example 20"), further to the method of Example 15, a surface area defined by the depressed area is greater than a surface area defined by the raised area.

According to another example, ("Example 21"), further to the method of Example 15, a surface area defined by the depressed area is equal to a surface area defined by the raised area.

According to another example, ("Example 22"), further to the method of Example 15, a surface area defined by the depressed area is less than a surface area defined by the raised area.

According to another example, ("Example 23"), further to the method of Example 15, the depressed area is planar.

According to another example, ("Example 24"), further to the method of Example 15, the depressed area is non-planar.

According to another example, ("Example 25"), further to the method of Example 15, at least one the pockets of the plurality of pockets has a volume that is different than another one of the pockets of the plurality of pockets.

According to another example, ("Example 26"), further to the method of Example 15, each of the pockets of the plurality of pockets has the same volume.

According to another example, ("Example 27"), further to the method of Example 15, each of the pockets of the plurality of pockets has an irregular outline.

According to another example, ("Example 28"), further to the method of Example 15, the cooking surface is formed using at least one of an additive and a subtractive manufacturing process.

According to another example ("Example 29"), a cooking fixture includes a base defining a cooking surface, the cooking surface having a raised area and a depressed area, the raised area being planar and the depressed area being defined by a plurality of pockets arranged in a random pattern, each pocket having a depth relative to the raised area, and the plurality of pockets collectively defining a depressed surface area, the raised area defining a raised surface area, the depressed surface area and the raised surface area combining to define the cooking surface area, and the depressed surface area constituting at least 30% of the cooking surface area.

According to another example, ("Example 30"), further to the cooking fixture of Example 29, the depressed surface area constitutes 30% to 80% of the cooking surface area.

According to another example, ("Example 31"), further to the cooking fixture of Example 29, each of the pockets of the plurality of pockets has a depth from 0.005 inches to 0.100 inches.

The foregoing Examples are just that and should not be read to limit or otherwise narrow the scope of any of the inventive concepts otherwise provided by the instant disclosure. While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

The accompanying drawings are included to provide a further understanding of the disclosure and are incorporated in and constitute a part of this specification, illustrate embodiments, and together with the description serve to explain the principles of the disclosure.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Definitions and Terminology

This disclosure is not meant to be read in a restrictive manner. For example, the terminology used in the application should be read broadly in the context of the meaning those in the field would attribute such terminology.

With respect to terminology of inexactitude, the terms "about" and "approximately" may be used, interchangeably, to refer to a measurement that includes the stated measurement and that also includes any measurements that are reasonably close to the stated measurement. Measurements that are reasonably close to the stated measurement deviate from the stated measurement by a reasonably small amount as understood and readily ascertained by individuals having ordinary skill in the relevant arts. Such deviations may be attributable to measurement error, differences in measurement and/or manufacturing equipment calibration, human error in reading and/or setting measurements, minor adjustments made to optimize performance and/or structural parameters in view of differences in measurements associated with other components, particular implementation scenarios, imprecise adjustment and/or manipulation of objects by a person or machine, and/or the like, for example. In the event it is determined that individuals having ordinary skill in the relevant arts would not readily ascertain values for such reasonably small differences, the terms "about" and "approximately" can be understood to mean plus or minus 10% of the stated value.

Description of Various Embodiments

Persons skilled in the art will readily appreciate that various aspects of the present disclosure can be realized by any number of methods and apparatuses configured to perform the intended functions. It should also be noted that the accompanying drawing figures referred to herein are not necessarily drawn to scale but may be exaggerated to illustrate various aspects of the present disclosure, and in that regard, the drawing figures should not be construed as limiting.

Figure 1:
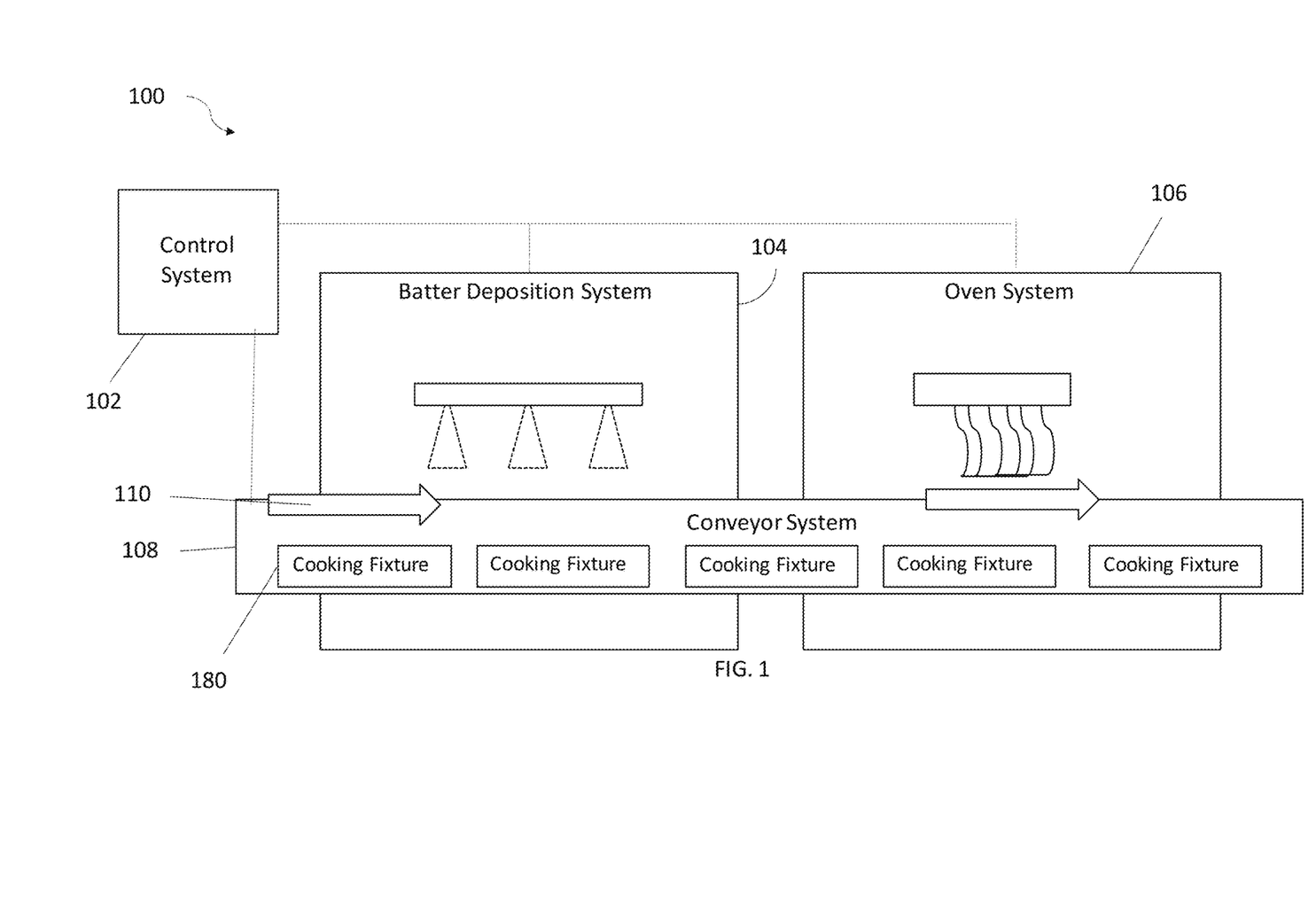
FIG. 1 shows a cooking system for use with one or more cooking fixtures, according to some embodiments.

FIG. 1 is a schematic view of a cooking system 100, according to some embodiments. As shown, the cooking system 100 includes a control system 102, a batter deposition system 104, an oven system 106, and a conveyor system 108. The control system 102 may include an automated control system, such as a programmable logic controller operated via an associated user interface for user control of the control system 102. The batter deposition system 104 is configured for depositing a batter product (not shown) onto the conveyor system 108. After the batter deposition system 104 deposits the batter product onto the conveyer system 108, the conveyor system 108 moves in a first direction 110 such that the batter product moves to be positioned within the oven system 106. The oven system 106 cooks the batter product into a cooked product (not shown). The oven system 106 parameters, such as set heat values and time for cooking the batter product within the oven system 106, may be parameters controlled by the control system 102. After baking the batter product and forming the cooked products, the cooking system 100 may include a system for collecting the cooked products. In this way, the conveyor system 108 can be cleared and can rotate to repeat the process of moving through the batter deposition system 104 and the oven system 106.

As shown, the conveyor system 108 includes a plurality of cooking fixtures 180. When the batter product is deposited from the batter deposition system 104, the batter product is deposited into the plurality of cooking fixtures 180 of the conveyor system 108. Each of the plurality of cooking fixtures 180 may be substantially similar to one another, or may vary (e.g., randomly) in pattern/design as desired. Various features that may be incorporated into each of the plurality of cooking fixtures 180 are described in greater detail herein with regard to a cooking fixture 180.

Figure 2A:
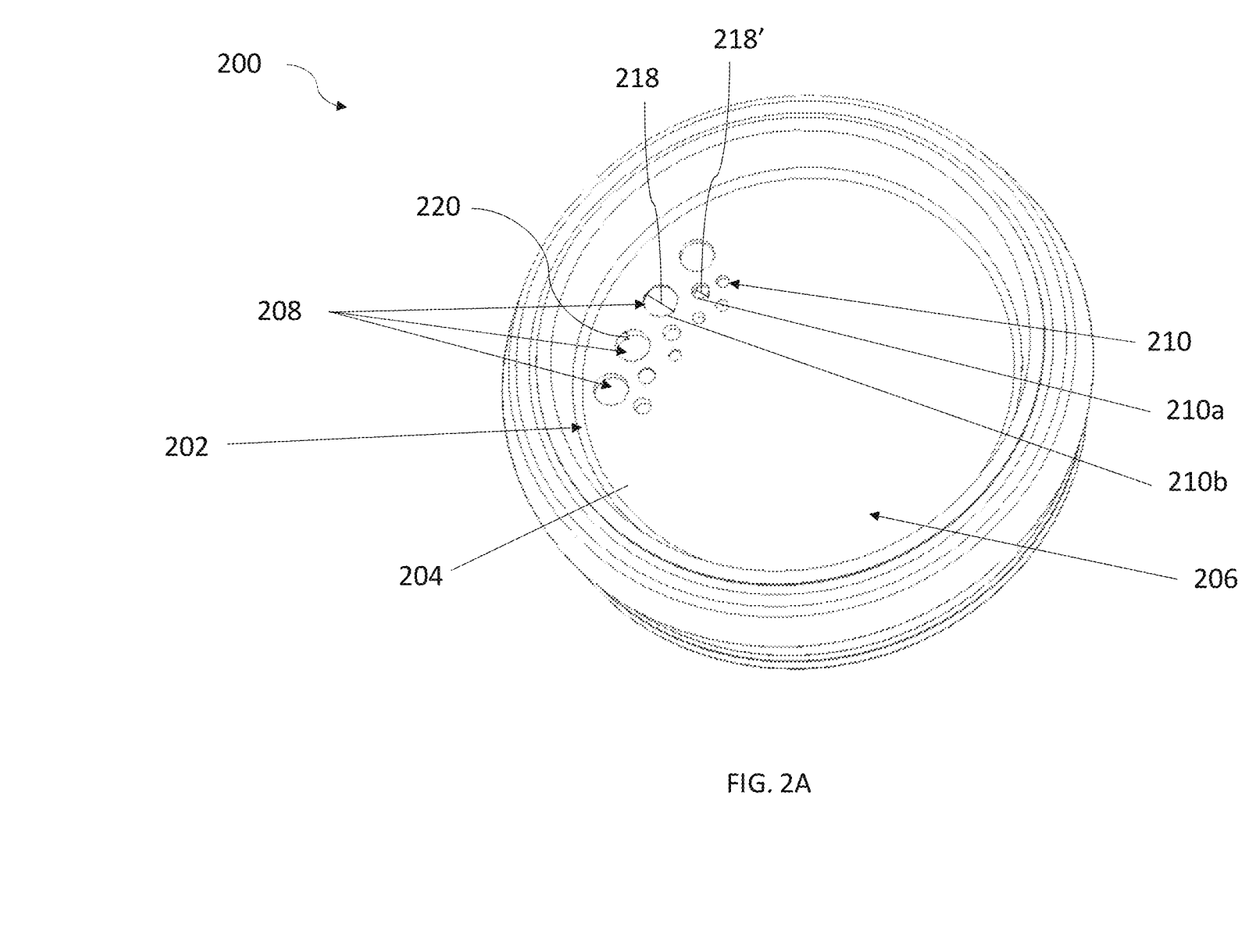
FIG. 2A shows a cooking fixture that can be used in relation to embodiments of the present invention, according to some embodiments.

FIG. 2A shows the cooking fixture 200, according to some embodiments. As shown, the cooking fixture 200 includes a base 202 that defines a cooking surface 204. The cooking surface 204 includes a raised area 206 and a depressed area 208. The raised area 206 is generally planar. The raised area 206 and the depressed area 208 may be formed by additive manufacturing methods (e.g., deposition of one or more layers on a base layer to form the raised and depressed areas 206, 208) or subtractive manufacturing methods (e.g., removing material from a base layer to form the raised and depressed areas 206, 208).

In various embodiments, the cooking surface 204 is formed by an additive layer of material that forms the raised area 206 and the depressed area 208 is defined between exposed areas of the additive layer. The additive layer may be attached onto the base 202, molded to the base 202, or coated to the base 202, for example. In this way, the base 202 may be a relatively planar surface prior to the attachment/formation of the cooking surface 204. In these embodiments, the material of the cooking surface 204 may be deposited as a reflowed material, a curable paste, a film, or other form. In subtractive methods, the cooking surface 204 may be formed by creating the depressed area 208 directly into the base 202. In these instances, the base 202 may already comprise a relatively planar raised area 206 and the use of a technique such as, but not limited to, cutting, milling, etching, drilling, or the like creates the depressed area 208 and its associated features.

The depressed area 208 includes a plurality of pockets 210. The plurality of pockets 210 are arranged relative to one another in a random pattern. Each of the plurality of pockets 210 has a depth 220 that is defined relative to the raised area. The depth 220 of the plurality of pockets may vary in relative to one another, for example each pocket having a different depth or one or more set(s) of pockets having a first depth and one or more set(s) of pockets having another depth. In various embodiments, the depth 220 of the plurality of pockets 210 ranges from 0.0025" to 0.093". In preferred instances, the depth 220 of the plurality of pockets 210 is from 0.005" to 0.020", such as 0.015". In various instances, the plurality of pockets 210 of the cooking fixture 200 may be relatively circular, as illustrated in the embodiment of FIG. 2A. Additionally, in embodiments, the random pattern of the plurality of pockets 210 includes the plurality of pockets 210 being separate and unconnected from one another. For example, as shown, one pocket 210a may be separate and unconnected from at least another pocket 210b.

Each of the plurality of pockets 210 has a diameter 218. The diameter 218 of the each of the plurality of pockets 210 may range from a value of $\frac{1}{8}^{th}$ of an inch to $\frac{2}{8}^{th}$ of an inch. In preferred instances, the diameter 218 of the plurality of pockets 210 may range from $\frac{1}{8}^{th}$ of an inch to $\frac{3}{16}^{th}$ of an inch. In various instances, the diameter 218 of each of the plurality of pockets 210 is approximately equal. In other instances, at least one of the plurality of pockets 210 has a diameter 218 that is different than another diameter 218 of another one the plurality of pockets 210. For example, the pocket 210a has a diameter 218' that is relatively smaller than the diameter 218 of pocket 210b. Additionally, a volume of each of the plurality of pockets 210 may be approximately equal. In other embodiments, the plurality of pockets 210 may have volumes that vary with respect to the volumes of the other pockets of the plurality of pockets 210. In certain instances, at least one of the pockets has a volume that is different than the remaining pockets of the plurality of pockets 210.

In embodiments, a surface area defined by the depressed area 208 is less than a surface area defined by the raised area 206. The depressed area 208 may be generally planar. In other embodiments, the depressed area 208 is not planar. For example, the depressed area 208 may vary from pocket to pocket, as described further with reference to FIG. 2C.

Figure 2B:
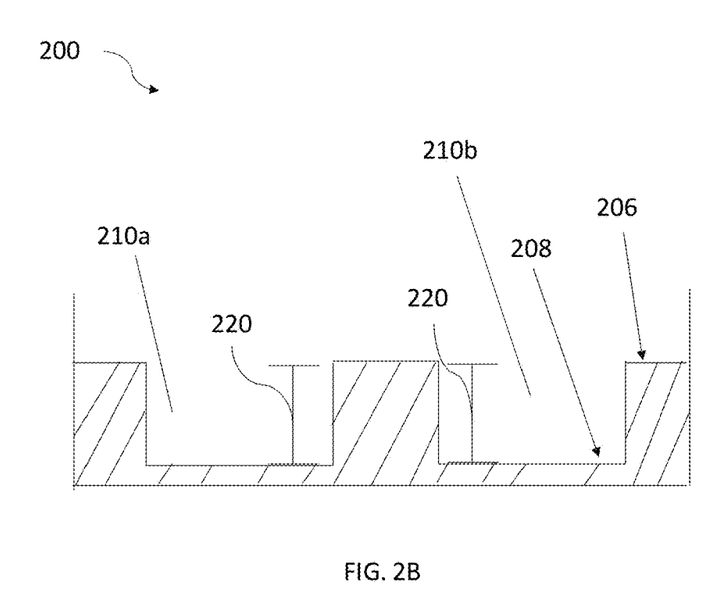
FIG. 2B shows a cross section of a portion of the cooking fixture of FIG. 2A that can be used in relation to embodiments of the present invention, according to some embodiments.

FIG. 2B shows a cross section of a portion of the cooking fixture 200, according to some embodiments. As previously described, the cooking fixture includes a raised area 206 and a depressed area 208 defined by the plurality of pockets 210. In this instance, the depth 220 of pocket 210a relative to the raised area 206, is equal to the depth 220 of pocket 210b relative to the raised area 206. In this way, the depressed area 208 is generally planar.

Figure 2C:
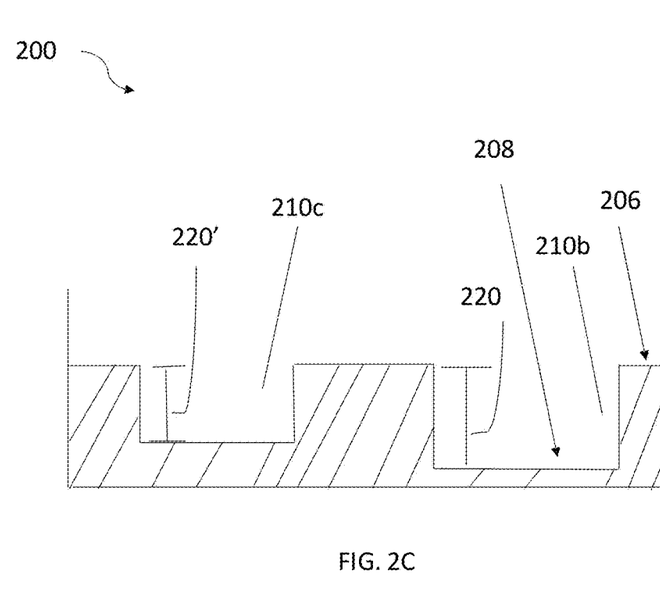
FIG. 2C shows a cross section of a portion of the cooking fixture of FIG. 2A that can be used in relation to embodiments of the present invention, according to some embodiments.

FIG. 2C shows a cross section of a portion of the cooking fixture 200, according to some embodiments. The cooking fixture 200 includes the raised area 206 and a depressed area 208. The cooking fixture 200 further includes the pocket 210a having the depth 220 relative to the raised surface 206. The cooking fixture 200 further includes a pocket 210c having a depth 220' relative to the raised surface 206. The depth 220' may be less than the depth 220 of the pocket 210a. In this way, the depressed area 208 of the cooking fixture 200 is not planar and varies at least between pocket 210a and 210c of the cooking fixture 200. In other embodiments, the depth 220' of pocket 210c may be greater than the depth 220 of the pocket 210b. While the features described in FIGS. 2B and 2C are described with reference to the cooking fixture 200, the various embodiments can be applied to cooking fixtures 300 and 400, which will be described further herein.

The cooking fixture shown in FIGS. 2A-2C is provided as an example of the various features of the device and, although the combination of those illustrated features is clearly within the scope of invention, that example and its illustration is not meant to suggest the inventive concepts provided herein are limited from fewer features, additional features, or alternative features to one or more of those features shown in FIGS. 2A-2C.

Figure 3:
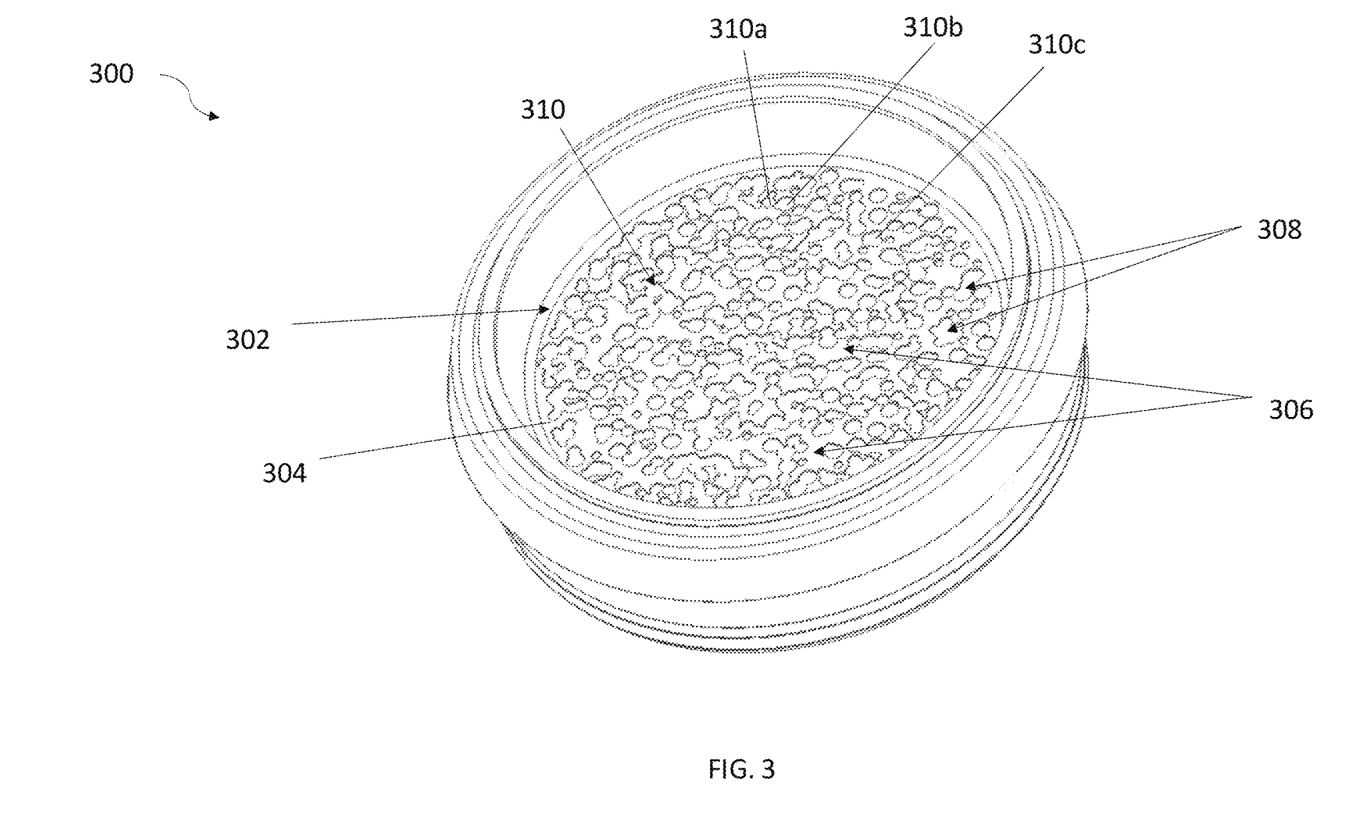
FIG. 3 shows a cooking fixture that can be used in relation to embodiments of the present invention, according to some embodiments.

FIG. 3 shows an embodiment of a cooking fixture 300 with additional and/or alternative features to those described above. As shown, the cooking fixture 300 includes a base 302 that defines a cooking surface 304. The cooking surface 304 includes a raised area 306 and a depressed area 308. The raised area 306 is generally planar. The depressed area 308 includes a plurality of pockets 310. The plurality of pockets 310 is arranged in a random pattern and each of the plurality of pockets 310 has a depth (not shown) that is defined relative to the raised area 306. In embodiments, the random pattern includes interconnected pockets. In certain instances, the random pattern may include a combination of various interconnected pockets and various separate, unconnected pockets. For example, pocket 310a and pocket 310b are interconnected, but pocket 310c is separate and unconnected from both pocket 310a and pocket 310b. Additionally, the depressed area 308 defines a surface area that may be relatively equal to a surface area defined by the raised area 306. In further instances, the surface area defined by the depressed area 308 may be greater than the surface area defined by the raised area 306. In other further instances, the surface area defined by the depressed area 308 may be less than the surface area defined by the raised area 306.

Figure 4:
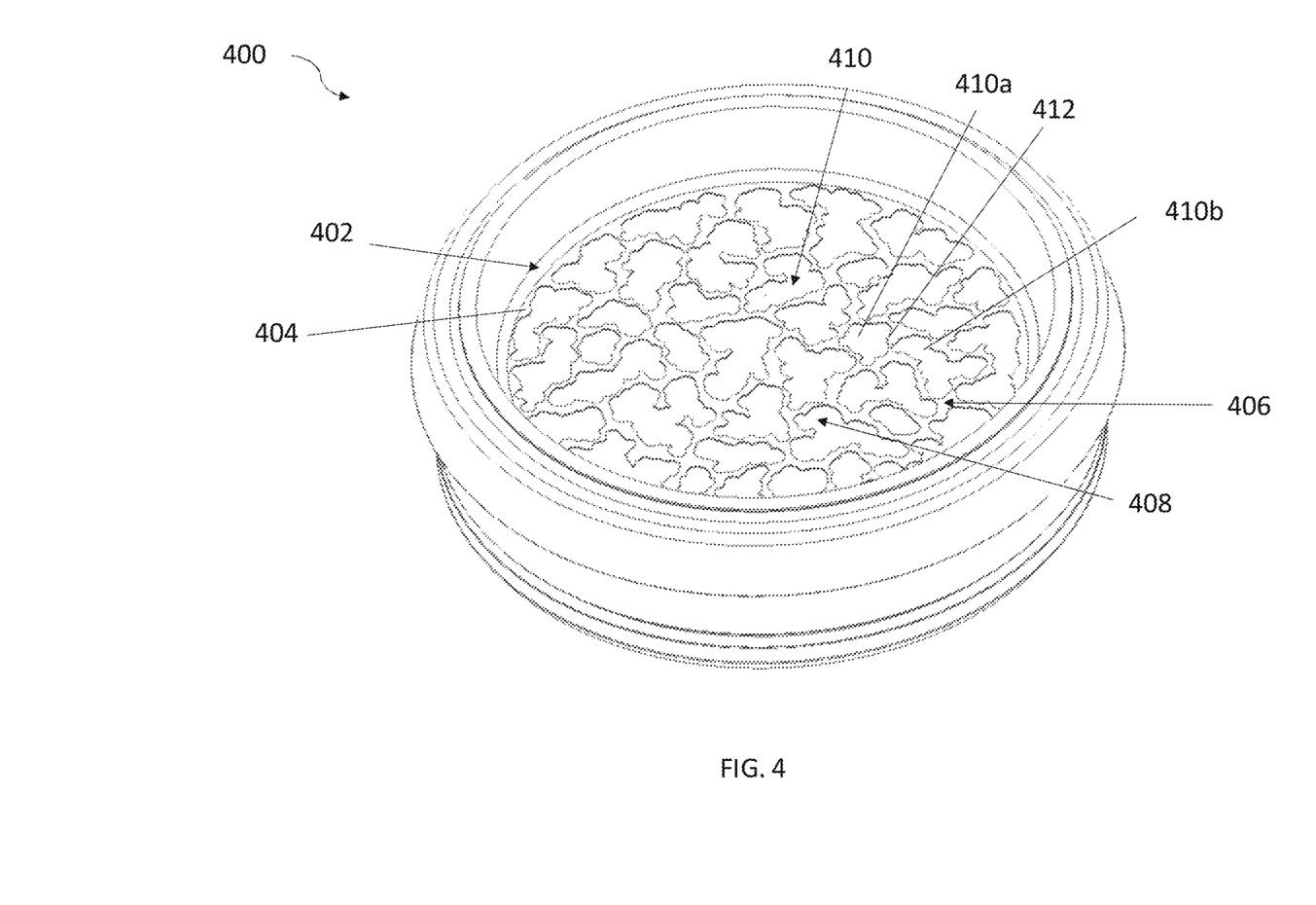
FIG. 4 shows a cooking fixture, according to some embodiments.

FIG. 4 shows another cooking fixture 400 with additional and/or alternative features to those described above. As shown, the cooking fixture 400 includes a base 402 that defines a cooking surface 404. The cooking surface 404 includes a raised area 406 and a depressed area 408. The raised area 406 is generally planar. The depressed area 408 includes and is defined by a plurality of pockets 410. The plurality of pockets 410 is arranged in a random pattern and each of the plurality of pockets 410 has a depth that is relative to the raised area 406.

In the illustrative embodiment of FIG. 4, the plurality of pockets 410 are generally separate unconnected pockets. For example, pockets 410a and 410b are shown separate and unconnected. Additionally, each of the plurality of pockets has an irregular outline 412, as seen in at least the pocket 410a of FIG. 4. For purposes of understanding, an "irregular" outline is one that is not symmetric, meandering, and/or not in the form of a traditional geometric shape (e.g., square, circular, oval, trapezoidal, etc.). As shown, each of the plurality of pockets 410 has an outline that is irregular in that it is asymmetrical in all axes with respect to a center of each of the plurality of pockets 410.

In embodiments, the plurality of pockets 410 collectively define a depressed surface area 408, and the raised area defines a raised surface area 406. Further, a cooking surface area, defined by the cooking surface 404, of the cooking fixture 400 is defined by the combination of the depressed surface area 408 and the raised surface area 406. In some embodiments, the depressed surface area 408 constitutes at least 30% of the cooking surface area. In preferred embodiments, the depressed surface area 408 constitutes from 50% to 80% of the cooking fixture 400. While described with reference to the cooking fixture 400 of FIG. 4, the aforementioned embodiments may also apply to the cooking fixtures 200, 300 and respective depressed surface areas 208, 308 and raised surface areas 206, 306 of FIGS. 2 and 3.

Figure 5A:
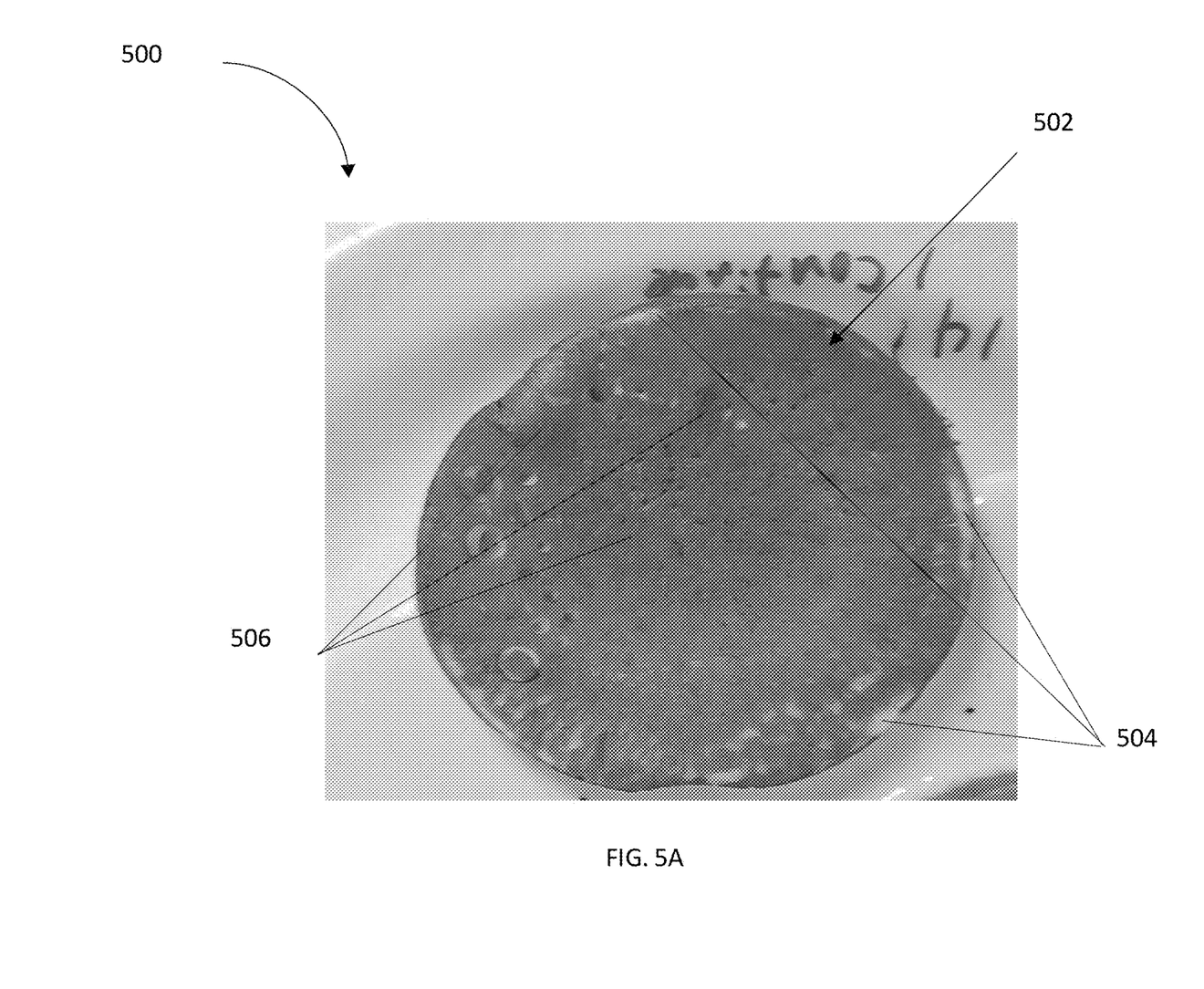
FIG. 5A shows a cooked product formed using the cooking fixture of FIG. 2A, according to some embodiments.

FIG. 5A is a perspective view of a cooked product 500 which is formed from the use of the cooking fixture 200, previously described with reference to FIG. 2A. The cooked product 500 includes a cooked surface 502 which corresponds to the cooking surface 204 of the cooking fixture 200. The cooked product 500 further includes a random mottled pattern having relatively lighter areas 504 and relatively darker areas 506. A total area defined by the relatively lighter areas 504 is less than a total area defined by the relatively darker areas 506. In other embodiments, the total area defined by the relatively lighter areas 504 may be about equal to the total area defined by the relatively darker areas 506. In further embodiments, the total area defined by the relatively lighter areas 504 is greater than the total area defined by the relatively darker areas 506.

Figure 5B:
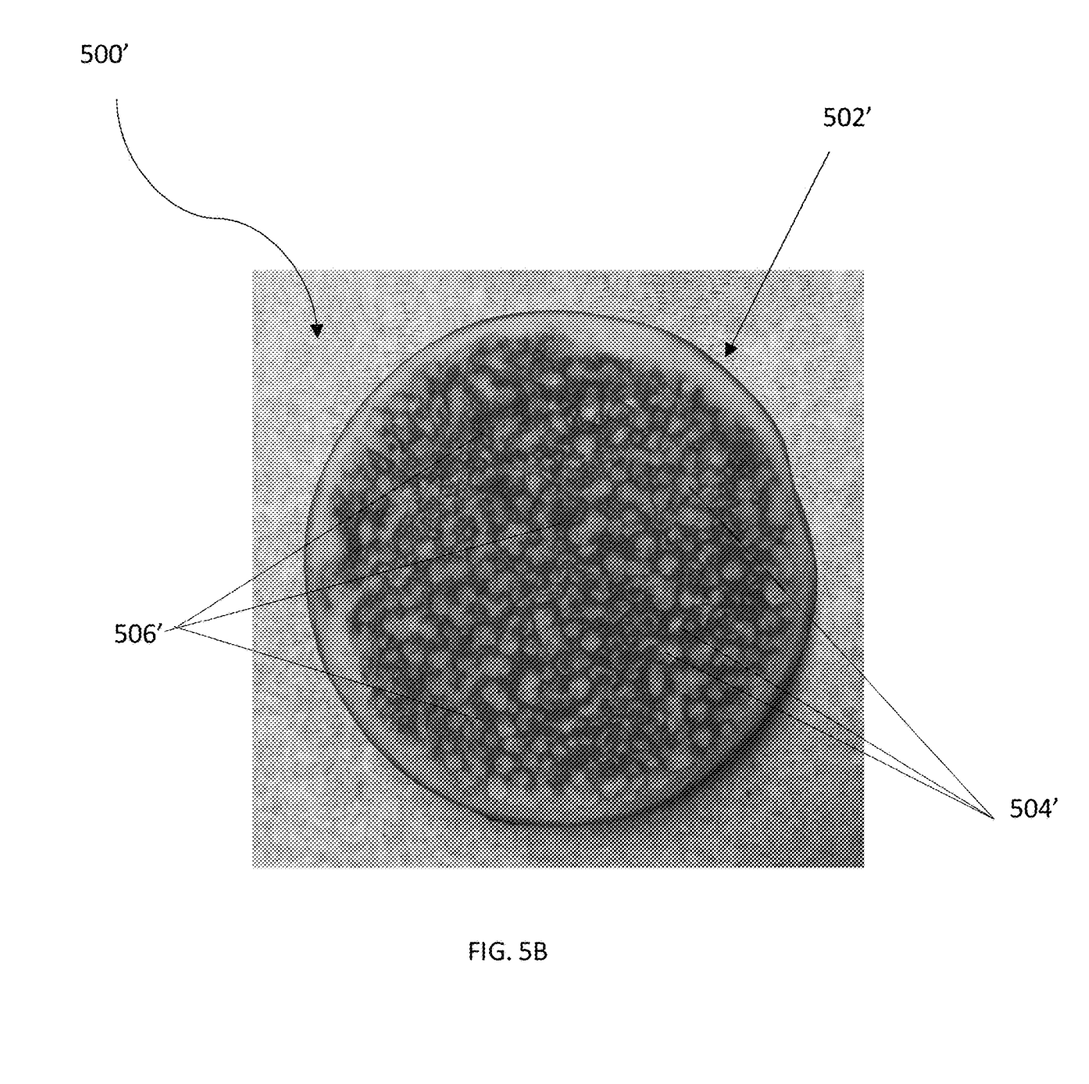
FIG. 5B shows a cooked product formed using the cooking fixture of FIG. 3, according to some embodiments.

FIG. 5B is a perspective view of a cooked product 500' which is formed from the use of cooking fixture 300. The cooked product 500' includes a cooked surface 502' which corresponds to the cooking surface 304 of the cooking fixture 300 previously described with reference to FIG. 3. The cooked surface 502' includes a random mottled pattern having relatively lighter areas 504' and relatively darker areas 506'. As previously described with respect to cooked product 500, a total area defined by the relatively lighter areas 504' is less than a total area defined by the relatively darker areas 506'. In other embodiments, the total area of the relatively lighter areas 504' may be about equal to a total area of the relatively darker areas 506'. In further embodiments, the total area defined by the relatively lighter areas 504' is greater than the total area defined by the relatively darker areas 506'.

Figure 5C:
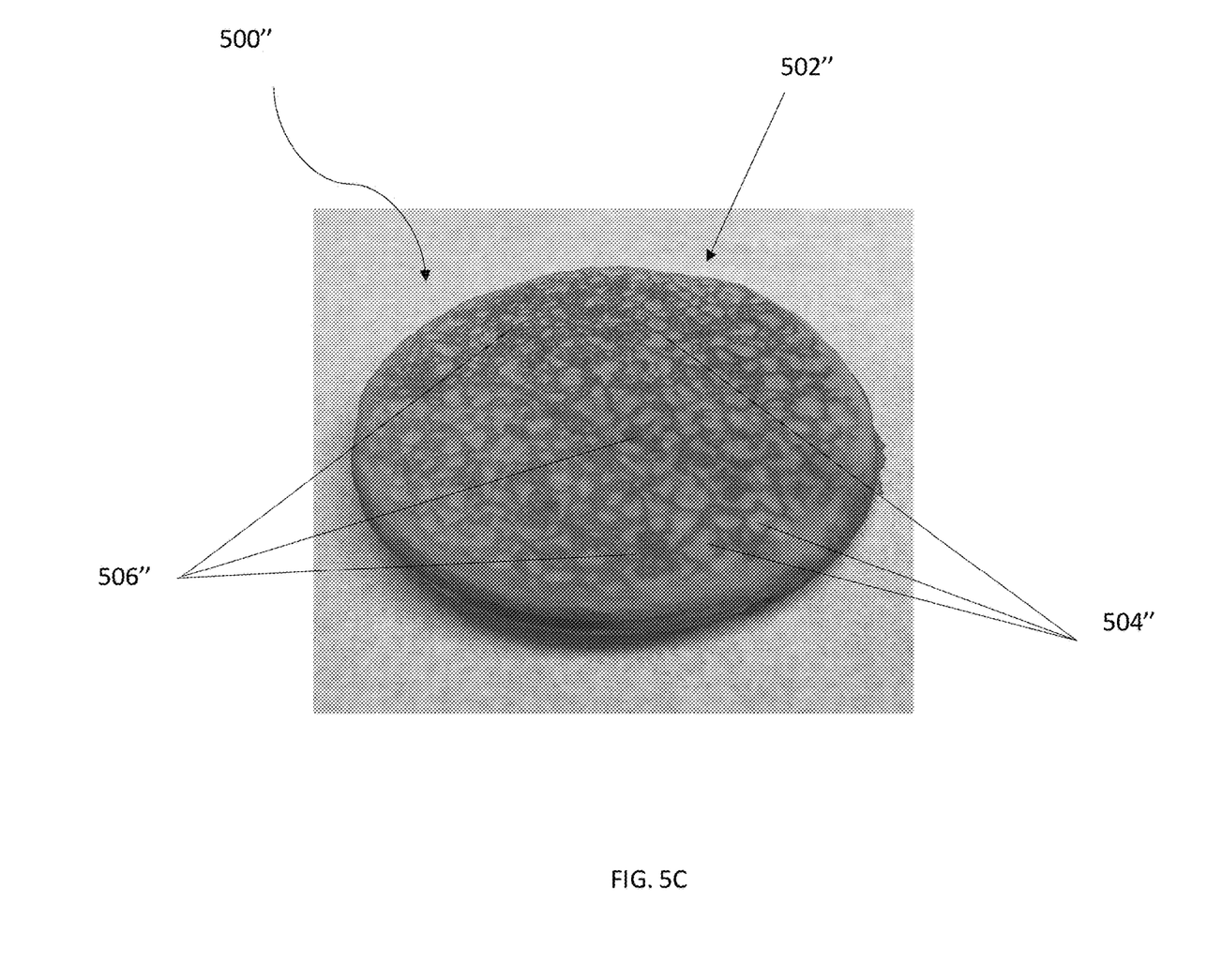
FIG. 5C shows a cooked product formed using the cooking fixture of FIG. 4, according to some embodiments.

FIG. 5C is a perspective view of a cooked product 500" which is formed form the use of cooking fixture 400. The cooked product 500" includes a cooked surface 502" which corresponds to the cooking surface 404 of the cooking fixture 400 previously described with reference to FIG. 4. The cooked surface 502" includes a random mottled pattern having relatively lighter areas 504" and relatively darker areas 506". Similar to the cooked product 500' of FIG. 5B, a total area defined by the relatively lighter areas 504" is less than a total area defined by the relatively darker areas 506". In other embodiments, the total area of the relatively lighter areas 504" may be about equal to a total area of the relatively darker areas 506". In further embodiments, the total area defined by the relatively lighter areas 504' is greater than the total area defined by the relatively darker areas 506'.

Figure 6:
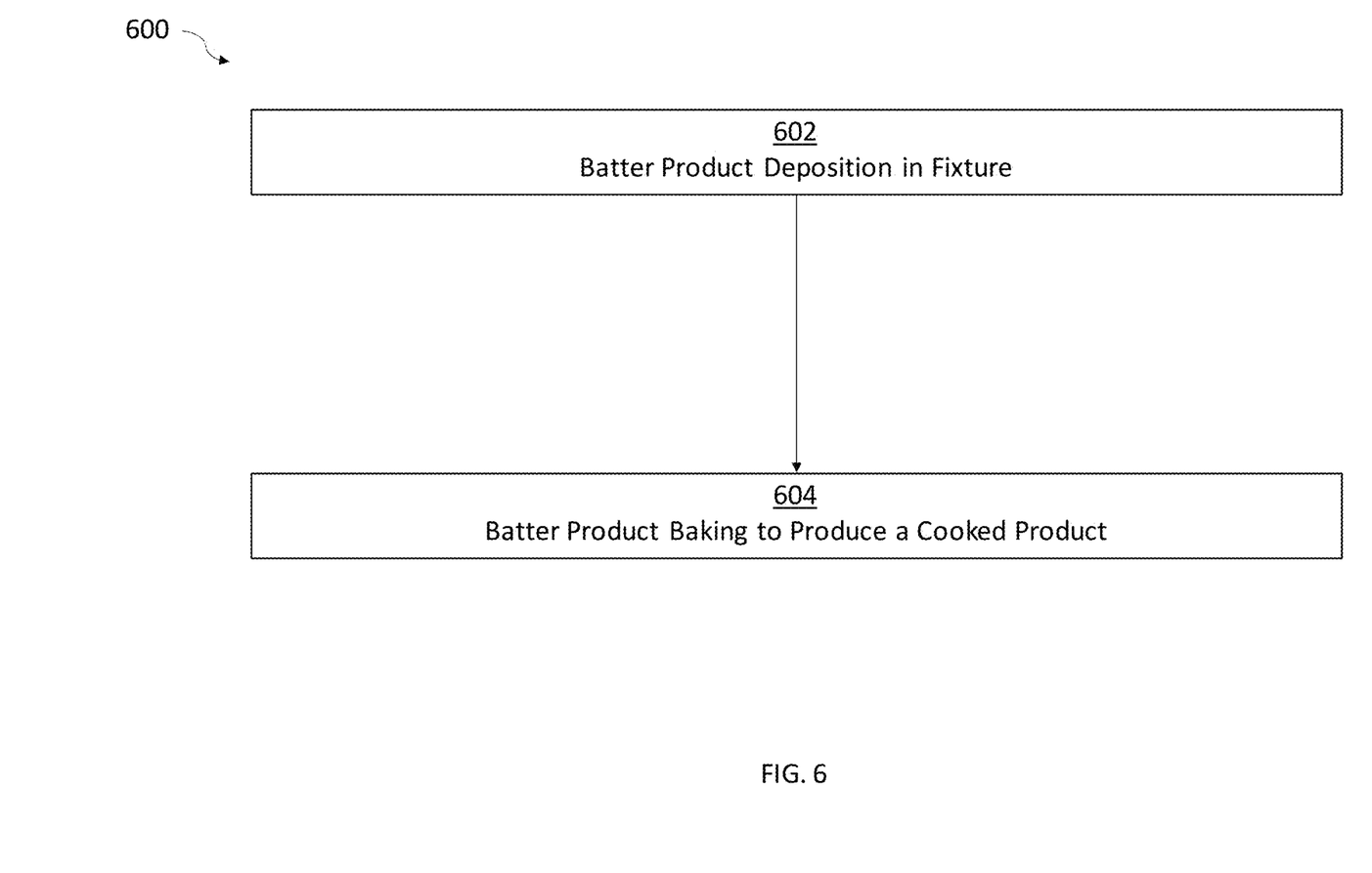
FIG. 6 is a flow chart illustrating a method of creating a cooked product, according to some embodiments.

FIG. 6 is a flow chart illustrating a method 600 of cooking a batter to form a cooked product. While the method is described in reference to the cooked product 500 and the cooking fixture 200, the method 600 may also be applied to forming the cooked products 500', 500" through the use of the cooking fixture 300 or cooking fixture 400, respectively.

At block 602, the method 600 first includes depositing a batter product (not shown) in a cooking fixture 200 being substantially free of an additional release agent when the batter is in the cooking fixture 200. The cooking fixture 200 includes the cooking surface 202 having the raised area 206 and the depressed area 208, the raised area 206 being planar and the depressed area 208 being defined by the plurality of pockets 210 arranged in a random pattern.

At block 604, the method 600 further comprising baking the batter product to produce a cooked product 500 from the batter product. The cooked product 500 includes a cooked surface 502 corresponding to the cooking surface 202 of the cooking fixture 200, and the cooked surface 502 having a random mottled pattern of relatively darker and lighter areas 506 and 504, respectively. In this way, the cooked products 500, 500' may include a desired random mottled appearance without the need for additionally release agents or oils. Instead, the cooking fixtures 200, 300, 400 can be used with the just the batter product to create the cooked products 500, 500', 500", respectively.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What is claimed is:

1. A cooking fixture comprising:
a base defining a cooking surface, the cooking surface having a raised area and a depressed area, the raised area being planar and the depressed area being defined by a plurality of pockets arranged in a random pattern, each pocket having a depth relative to the raised area, wherein the random pattern includes a first pocket having a first irregular outline and a second pocket having a second irregular outline, wherein the first and second irregular outlines are different from each other such that first pocket has a volume that is different than a volume of the second pocket.

2. The cooking fixture of claim 1, wherein the random pattern includes interconnected pockets.

3. The cooking fixture of claim 1, wherein the random pattern includes separate, unconnected pockets.

4. The cooking fixture of claim 1, wherein a surface area defined by the depressed area is greater than a surface area defined by the raised area.

5. The cooking fixture of claim 1, wherein a surface area defined by the depressed area is equal to a surface area defined by the raised area.

6. The cooking fixture of claim 1, wherein a surface area defined by the depressed area is less than a surface area defined by the raised area.

7. The cooking fixture of claim 1, wherein the depressed area is planar.

8. The cooking fixture of claim 1, wherein the depressed area is non-planar.

9. The cooking fixture of claim 1, wherein remaining pockets of the plurality of pockets have the same volume as each other.

10. A method of cooking a batter product within the cooking fixture of claim 1 to produce a cooked product, the method comprising:
depositing a batter product in the cooking fixture, the cooking fixture being substantially free of an additional release agent when the batter is deposited in the cooking fixture; and
baking the batter product within the cooking fixture to produce a cooked product from the batter product, the cooked product having a cooked surface corresponding to the cooking surface of the cooking fixture.

11. The cooking method of claim 10, wherein the random mottled pattern includes interconnected pockets.

12. The cooking method of claim 10, wherein the random mottled pattern includes separate, unconnected pockets.

13. The cooking method of claim 10, wherein a surface area defined by the depressed area is greater than a surface area defined by the raised area.

14. The cooking method of claim 10, wherein a surface area defined by the depressed area is equal to a surface area defined by the raised area.

15. The cooking method of claim 10, wherein a surface area defined by the depressed area is less than a surface area defined by the raised area.

16. The cooking method of claim 10, wherein the depressed area is planar.

17. The cooking method of claim 10, wherein the depressed area is non-planar.

18. A cooking fixture comprising:
a base defining a cooking surface, the cooking surface having a raised area and a depressed area, the raised area being planar and the depressed area being defined by a plurality of pockets arranged in a random pattern including one or more pockets having an irregular shape being asymmetrical in all axes with respect to a center of the respective pocket, each pocket having a depth relative to the raised area, and the plurality of pockets collectively defining a depressed surface area, the raised area defining a raised surface area, the depressed surface area and the raised surface area combining to define the cooking surface area, the depressed surface area constitutes at least 30% of the cooking surface area.

19. The cooking fixture of claim 18, wherein the depressed surface area constitutes 30% to 80% of the cooking surface area.

20. The cooking fixture of claim 18, wherein each of the pockets of the plurality of pockets has a depth from 0.005 inches to 0.100 inches.

* * * * *